United States Patent [19]

Stewart

[11] Patent Number: 4,841,773
[45] Date of Patent: Jun. 27, 1989

[54] MINIATURE INERTIAL MEASUREMENT UNIT

[75] Inventor: Robert E. Stewart, Woodland Hills, Calif.

[73] Assignee: Litton Systems, Inc., Woodland Hills, Calif.

[21] Appl. No.: 45,045

[22] Filed: May 1, 1987

[51] Int. Cl.⁴ .............................................. G01P 9/04
[52] U.S. Cl. ....................................... 73/510; 73/505
[58] Field of Search .............. 73/504, 505, 510, 517 R

[56] References Cited

U.S. PATENT DOCUMENTS

| 3,304,787 | 2/1967 | Chiku et al. | 73/517 R |
|---|---|---|---|
| 3,382,726 | 5/1968 | Erdley . | |
| 3,559,492 | 2/1971 | Erdley . | |
| 3,842,681 | 10/1974 | Mumme | 73/505 |
| 4,222,272 | 9/1980 | Mairson | 73/517 R |
| 4,311,046 | 1/1982 | Pittman . | |
| 4,444,053 | 4/1984 | Rider . | |
| 4,445,376 | 5/1984 | Merhav . | |
| 4,510,802 | 4/1985 | Peters . | |
| 4,529,669 | 6/1985 | Rider . | |
| 4,679,434 | 7/1987 | Stewart . | |

OTHER PUBLICATIONS

Merhav, S. J., "A Non Gyroscopic Inertial Measurement Unit," *Journal of Guidance and Control*, vol. 5, No. 3, May–Jun., 1982, pp. 227–235.

*Primary Examiner*—John Chapman
*Attorney, Agent, or Firm*—Poms, Smith, Lande & Rose

[57] ABSTRACT

A three axis inertial measurement unit (IMU) is shown with three pairs of accelerometers mounted upon a platform that is rotated about a single axis perpendicular to the plane of the platform. Each pair of accelerometers is mounted in parallel, at an angle to the platform and to the single axis and at the same distance from the axis. The rotational motion may be either an oscillation about a dither axis or spinning about a spin axis.

23 Claims, 4 Drawing Sheets

MINIATURE INERTIAL MEASUREMENT UNIT

This invention was made with government support under Contract DAAA21-85-C-0290 awarded by the Department of the Army.

BACKGROUND OF THE INVENTION

1. Field of Invention

The present invention relates to an inertial measurement unit (IMU) and, more particularly, to a small size, low weight, minimum power and low cost inertial measurement unit utilizing a plurality of sensors rotated about a single axis.

2. Description of the Prior Art

Existing strap down inertial measurement units typically consist of a cluster of separate gyros and accelerometers of complex electromechanical and/or electro-optical design. These IMUs were originally designed to meet the high performance requirements of an aircraft navigation system with operation times measured in hours. Application of these gyros and accelerometers to flight control IMU's for short duration flight, such as required for expendable weapons which operate in times measured in minutes, has resulted in systems with excessive size, weight, power, and cost, and with inadequate environmental capabilities. Remember that the existing strap down IMUs typically require a separate gyro and accelerometer for each axis within a three axis orthogonal system.

Some systems have been proposed which reduce the number of gyros and accelerometers by using one specialized sensor for sensing two axes. Typically, the specialized sensor is placed upon a spinning shaft. As the multiple sensor is capable of sensing two of the three axes within an orthogonal system, there still remains the requirement for two sets of the sensors as well as the need for motors and bearings to accommodate the spinning axes. This also results in a redundant axis which adds size, weight, and cost.

Another approach to an inertial measurement unit for measuring the specific force and angular velocity of a moving body utilizes an orthogonal triad of rotating accelerometers. This system reduces the number of components required to provide an IMU, but there still remains the requirement for spinning three accelerometers around the three orthogonal axes with the accompanying requirement for bearings and spin motors and resolvers. It has also been suggested that the spinning accelerometers may be vibrated in an oscillating manner instead of spinning around the orthogonal axes.

A further improvement on the arrangement just described vibrates two accelerometers in a back-and-forth arrangement utilizing a parallelogram structure to mount the accelerometers. This arrangement introduces errors in that the motion induced by the parallelogram is not a linear nor a revolving motion but a generally curved motion. The parallelogram structure is also complicated and bulky.

SUMMARY OF THE INVENTION

Accordingly, it is an object of the present invention to provide a miniature, low cost, three axis inertial measurement unit.

It is a further object to provide a low cost ineretial measurement unit which is relatively unaffected by heat and vibration.

In accomplishing these and other objects, there is provided a platform arranged to be rotated about a single axis upon which are mounted a plurality of sensors, such as solid state accelerometers. The accelerometers are mounted at an angle to the platform and to the single axis such that the rotary motion thereof allows the accelerometers to sense the angular rotation rates by measuring induced Coriolis accelerations. The Coriolis accelerations are proportional to the vector cross product of the accelerometer's vibration velocity and the applied angular velocity. The output signals from the accelerometers include the desired linear acceleration and angular velocity necessary to provide the information needed for measurements by inertial measurement units. This information is extracted by circuitry which takes the sum and difference of the accelerometer pairs and performs the necessary quantization, coordinate transformation and compensation to yield compensated $\Delta\theta$ and $\Delta V$ outputs in either body fixed or inertial coordinate frame.

BRIEF DESCRIPTION OF THE DRAWINGS

A better understanding of the invention and the advantages thereof will be had after careful consideration of the following specification and drawings wherein.

DESCRIPTION OF THE PREFERRED EMBODIMENT

Figure 1:
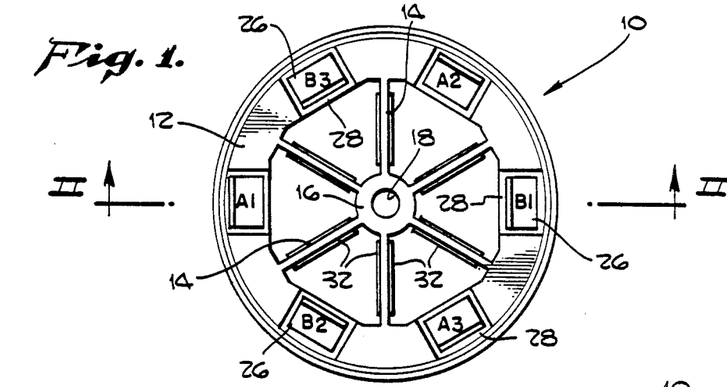
FIG. 1 is a top plan view of a inertial measurement unit which incorporates the present invention.

The inertial measurement unit 10 of the preferred embodiment is shown in FIG. 1 having a ring shaped platform 12 attached by veins 14 to a hub 16 having an aperture 18 therein. The hub 16, veins 14, and platform 12 form a paddle-wheel like platform which rests upon a base 20 that, in turn, may be mounted upon the vehicle whose movements are to be monitored by the inertial measurement unit 10. The paddle-wheel platform 12 is secured to base 20 by a bolt 22 and is protected by a cover 24, best seen in FIG. 2.

Figure 2:
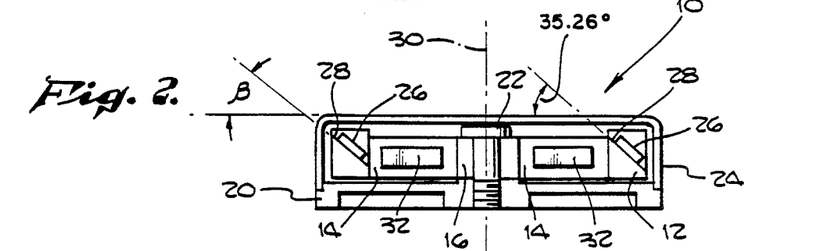
FIG. 2 is a cross-sectional view taken along line II—II of FIG. 1.
Figure 3:
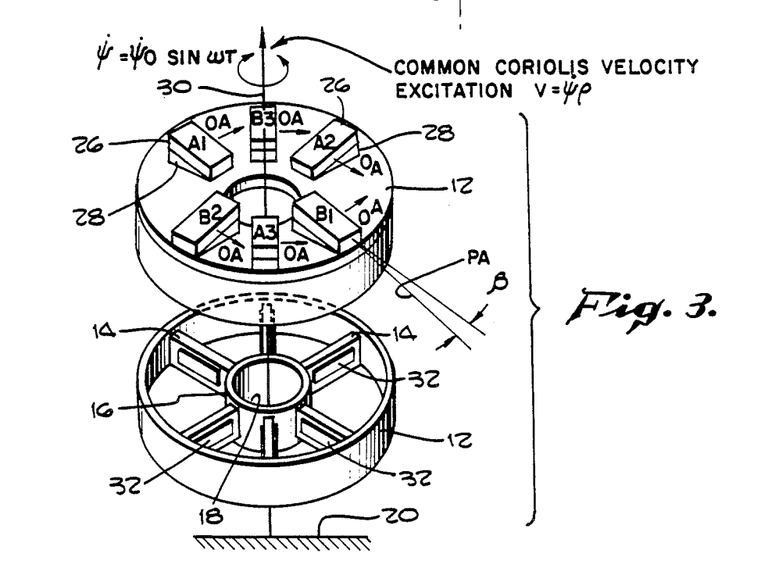
FIG. 3 is an exploded perspective view showing the concept embodied in FIGS. 1 and 2.

Mounted upon the surface of platform 12 are a plurality of sensors 26 which are mounted upon canted surfaces 28 machined within the platform 12. As best seen in FIGS. 2 and 3, the sensors 26 are mounted in sets of three with the sensors labeled $A_1$, $A_2$, and $A_3$ (FIG. 3)

canted at an angle to a rotary axis 30 so that the edges closest to aperture 18 are lower than the opposite edges. Similarly, sensors $B_1$, $B_2$, and $B_3$ are mounted with the edges closest to the axis 30 of platform 12 at the highest point. It will be seen in FIG. 2 that sensors $A_1$ and $B_1$ are mounted with the canted surfaces 28 parallel to each other and at an angle to the platform 12 and to the single axis 30.

In the preferred embodiment, a plurality of piezoelectric drive members, in the form of thin strips 32, are bonded or otherwise attached to both sides of the veins 14. The piezoelectric drive members 32 are driven by suitable electric signals to cause one on one side of vein 14 to constrict while the other expands. This causes the veins 14 to bend for producing an oscillation of the ring shaped platform 12. This oscillation may be a sinusoidal vibration about the axis 30 which becomes a dither axis.

Alternately, the platform 12 may be spun about the axis 30 which becomes a spin axis.

Figures 4, 5:
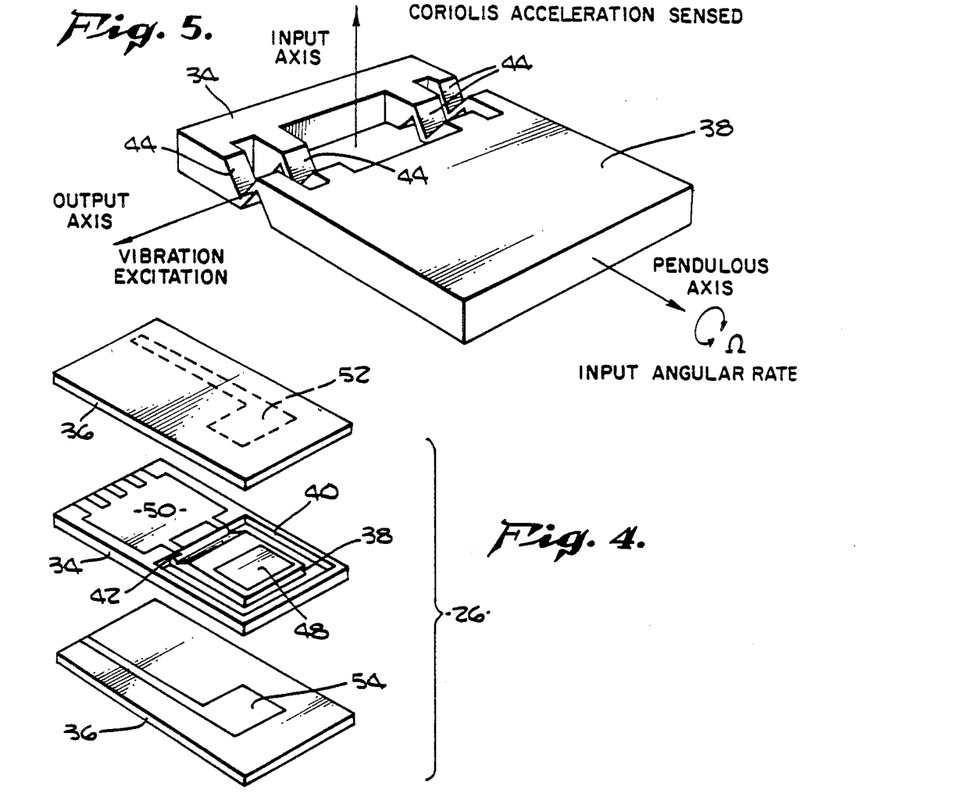
FIG. 4 is an exploded perspective view showing an accelerometer utilized within the present invention.
FIG. 5 shows the proofmass of the accelerometer of FIG. 4 in greater detail, including the orientation of the input axis, output axis, and pendulous axis.

In the preferred embodiment, the sensors 26 are accelerometers fabricated by anisotropic etching and selective doping a silicon wafer. This technique, borrowed from the electronics industry, utilizes silicon wafers to produce highly specialized and accurately machined parts in large quantities for relatively low costs. As seen in FIG. 4, the accelerometer 26 includes a single crystal silicon chip 34 sandwiched between a pair of nonconductive insulative members 36 which may be made from pyrex. The heart of the accelerometer is formed by a proofmass 38 which has been separated from silicon chip 34 by an etched channel 40 to free the proofmass 38 along at least three of its edges. The fourth edge is provided with a hinge 42 which may be formed by etching away some, but not all of the edge that joins the proofmass 38 to the silicon chip 34.

Any hinge design will do within the present invention. However, the preferred embodiment may utilize a crossed beam flexure blade hinge 44 as more fully described in a patent application entitled INTEGRATED, FORCE BALANCED ACCELEROMETER, U.S. Pat. No. 4,679,434, issued July 14, 1987, and assigned to the common assignee. The crossed blade flexure beam 44 is shown more completely in FIG. 5.

As seen in FIG. 4, the proofmass 38 is doped to form a conductive plate 48 on its oppossite surfaces. The silicon chip 34 may also be doped to connect the plates 48 to suitable electronics 50 mounted either on the proofmass 38 or the chip 34. A pair of electrodes 52 and 54 are respectively deposited on the lower surface of the upper plate 36 and the upper surface of the lower plate 36 opposite the conductive plates 48. In operation, the accelerometer sensor 26 applies suitable electrostatic charges to plates 52 and 54 to attract the pendulous proofmass 38 to a neutral position. The signals thus generated are utilized within the electronics of the inertial measurement unit 10.

As seen in FIG. 5, the proofmass or pendulum 38 has three basic axes. These include an output axis (OA) which passes through the center of the crossed beam flexure blade hinge 44. Perpendicular to the output axis (OA) and passing through the plane of the pendulous mass 38 is a pendulous axis (PA). Perpendicular to these two axes is an input axis (IA).

There are many advantages to fabricating the accelerometer sensor 26 from a silicon chip 34 sandwiched between pyrex plates 36. For one thing, the tensile yield strength of single crystal silicon is $6.9 \times 10$ 10 dynes/cm$^2$ or about three times that of stainless steel. The absence of grain boundaries or defects within the high purity single crystal lattice permits extremely elastic flexures to be formed free of mechanical hysteresis. Material properties of the silicon accelerometer hinge 42 or 44, proofmass 38, and frame 34 are identical, continuous and free of built-in-stresses because they are all etched from a single crystal. The silicon accelerometer may be fabricated for low cost in small sizes. The excellent mechanical properties mentioned above coupled with nonmagnetic properties, the nonorganic materials and the potential to integrate electronics onto the chip make the silicon chip accelerometer extremely useful in the present invention.

The principal of operation of the inertial measurement unit 10 utilizing a Coriolis based multisensor concept and common mode rejection is shown in FIG. 5. To measure angular velocities using linear accelerometers, it is necessary to impart a velocity to the accelerometer along an axis perpendicular to its input axis and sense the Coriolis acceleration induced by angular velocities applied about the axis which is mutually orthogonal. FIG. 5 illustrates this principal of operation showing the relationship between the axes of the accelerometer, including: the vibration excitation along the output axis (OA), the input angular rate along the pendulous axis (PA), and the Coriolis acceleration sensed along the input axis (IA). The choise of vibrating or oscillating the accelerometers 26 rather than spinning to induce the excitation velocity for angular rate measurement is one of design preference. Either will produce the results desired by the present invention.

Figure 6:
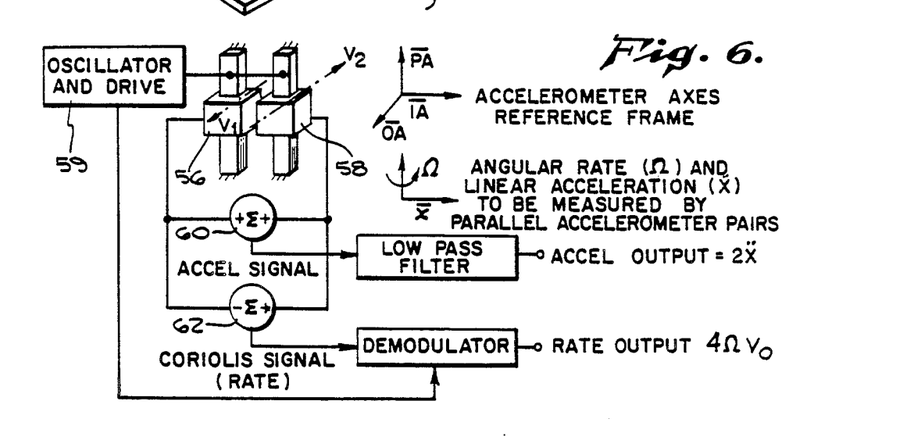
FIG. 6 is a schematic diagram illustrating a multifunction sensor which demonstrates a pair of opposing accelerometers and their ability to cancel the random vibration induced in angular velocity measurements via common mode rejection.

The reason for using accelerometer pairs 26, as seen in FIG. 6 at 56 and 58, is that it permits the cancellation of randomly induced vibrations. This cancellation is accomplished by the common mode rejection of oppositely oriented accelerometers vibrated at the same frequency but 180° out of phase of each other. Thus, sensor $A_1$ is paired with sensor $B_1$. These sensors are oriented with their output axis (OA) pointed in the same direction about the platform 12 as seen in FIG. 3. The effect of this orientation is to cancel the random vibration having energy at the oscillation frequency by common mode rejection. One advantage of the vibration over spinning is the elimination of spin bearings and the magnetic and inductive components associated with spin motors and resolvers.

Referring again to FIG. 6, a single axis multisensor is shown in a block diagram which illustrates common mode rejection. This multisensor is further described in a pending patent application entitled SINGLE AXIS VIBRATION ACCELEROMETER MULTISENSOR, U.S. Pat. No. 4,744,248, issued May 17, 1988, and assigned the common assignee. The two parallel accelerometers 56 and 58 are mechanically oscillated by a drive mechanism 59 along their output axes (OA) as a balanced load such that their velocity excitations ($V_1$) are equal and opposite sinusoids of the form:

$$V_1 = V_0 \sin(\omega t)$$

$$V_2 = V_0 \sin(\omega t + 180°) = V_0 \sin(\omega t)$$

$$V_1 = V_2$$

Then in the presence of an angular velocity ($\Omega$) along the accelerometers' pendulous axes (PA) and an acceleration ( ) in the direction of the instruments' input axes (IA), the total acceleration measured by each accelerometer is:

Accel 56 = $\ddot{X} + 2\Omega V_0 \sin(\omega t)$

Accel 58 = $\ddot{X} - 2\Omega V_0 \sin(\omega t)$

The summed total measurement of the two accelerometers at summing amplifier 60 is:

Accel 56 + Accel 58 = $(\ddot{X} + 2\Omega V_0 \sin(\omega t)) - (\ddot{X} - 2\Omega V_0 \sin(\omega t))$ Accel 56 + Accel 58 = $2\ddot{X}$ provides a measurement of twice the linear acceleration and rejects the common out of phase Coriolis acceleration. Similarly, the subtracted or differenced accelerometer measurements at difference amplifier 62 is:

Accel 56 − Accel 58 = $(\ddot{X} + 2\Omega V_0 \sin(\omega t)) - (\ddot{X} - 2\Omega V_0 \sin(\omega t))$ Accel 56 − Accel 58 = $4\Omega V_0 \sin \omega t$ yields a signal whose amplitude ($4\Omega V_0$) is proportional to the desired angular velocity measurement (i.e., two times the Coriolis acceleration) and rejects the common linear acceleration. Therefore, it becomes feasible to mechanize a viable, complete inertial measurement unit 10, with three pairs of parallel accelerometers 26, a sinusoidal velocity excitation, and the appropriate electronics to sum and difference the outputs of pairs of accelerometers.

While six accelerometers work nicely to eliminate random vibration by common mode rejection, three accelerometers may be utilized in benign environments where no vibration is present, such as space.

The preferred embodiment of the present invention consists of six accelerometers 26 mounted sixty degrees apart upon the rim of the paddle-wheel shaped body that forms the platform 12. In the preferred embodiment, an AC voltage is used to drive the piezoelectric strips 32 resulting in the simple sinusoidal oscillation of the accelerometers 26. As seen in FIG. 3, the accelerometer sensors 26 are mounted as three pairs of pendulous accelerometers $A_1$, $A_2$, and $A_3$; and $B_1$, $B_2$, and $B_3$. The accelerometer pairs (A and B) are parallel, i.e., parallel input axes (IO), parallel output axes (OA), and parallel pendulous axes (PA). The output axes (OA) are all mounted in a common plane perpendicular to the dithered axis 30. The centers of gravity of each accelerometer's proofmass 38 are all at an equal distance from the dither axis 30. The accelerometer pendulous axes (PA) and the input axes (IA) are canted at an angle to the mounting plane of platform 12 and the dither axis 30.

The canted angle may be established by placing a cube on one of its corners such that a bisector of the angles which form the corner is perpendicular to the plane upon which the corner rests. In this configuration, the angle of each corner edge is 35.26° to the plane. In the preferred embodiment, this is the angle at which the canted surfaces 28 are cut into the platform 12. In this configuration, the pendulous axes (PA) of each set of accelerometers A and B form an orthogonal coordinate about the dithered axis 30. However, the input axes (IO) do not form an orthogonal coordinate when intersecting the dithered axis 30. It is not possible to arrange a system in which each sensor has an orthogonal set of axes such that the pendulous axes and the input axes each intersect the dithered axis in a mutual orthogonal arrangement. While the preferred angle of canted surface 28 is 35.26°, any angle other than 0° and 90° may be utilized. In some applications, it is more desirable to arrange the accelerometers at an angle which will emphasize one axis over the others.

Figure 7:
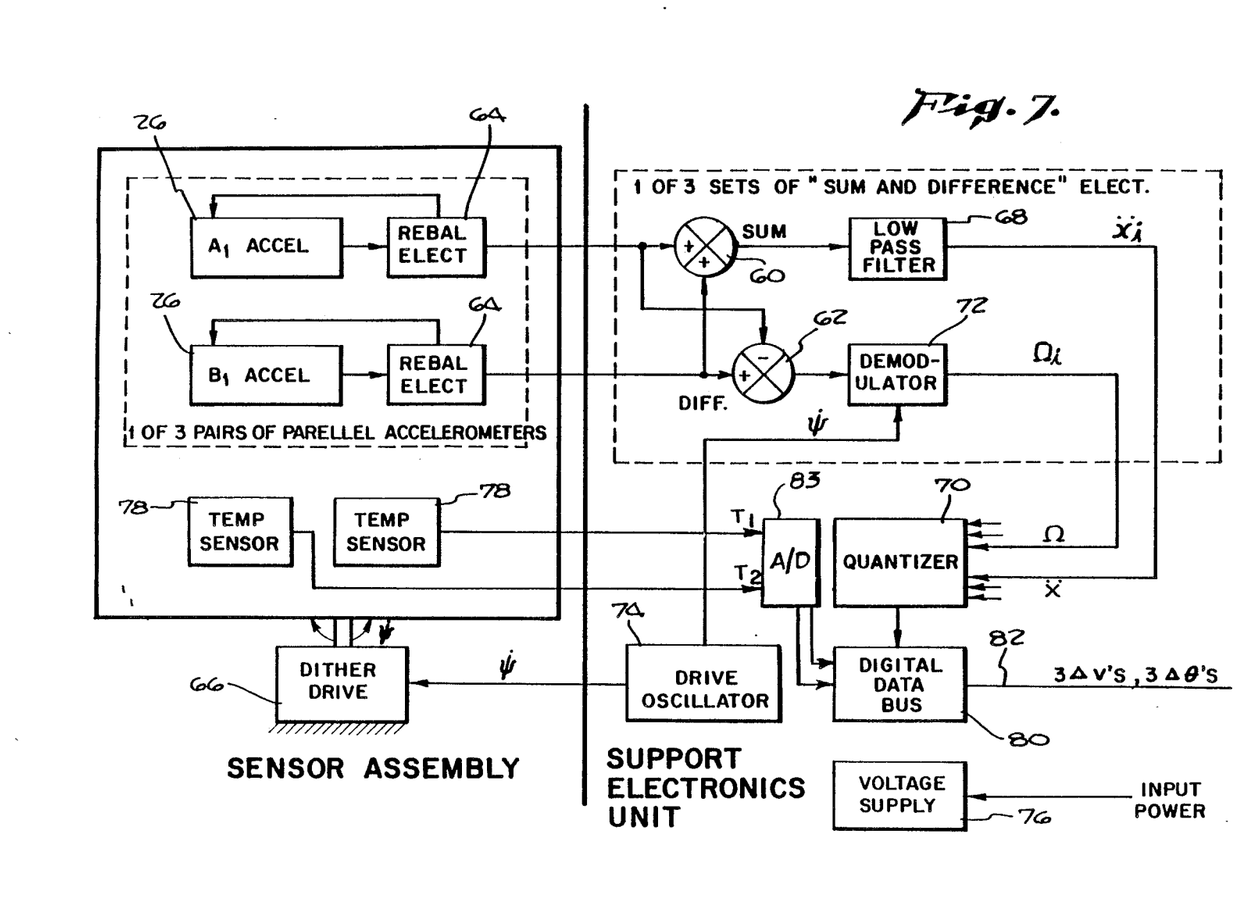
FIG. 7 is a schematic diagram illustrating the electronics of the present invention.

Referring now to FIG. 7, a circuit which may be used to operate the three axis inertial measurement unit 10 is shown. It will be seen that some of the electronics may be fabricated upon the sensor assembly of the silicon chip 34 as shown at 50 (FIG. 4), while the support electronics unit may be formed from very large scale integration (VLSI) circuits closely associated with the electronics 50. The circuit for one pair of accelerometers 26 ($A_1$ and $B_1$) is shown within the dotted line box. Similarly, only one set of the sum and difference amplifiers 60 and 62 is shown. The accelerometers 26 ($A_1$ and $B_1$) produce an output signal applied to rebalance electronics 64 which applies a feedback signal to the accelerometers 26. More particularly, as the proofmass 38 moves in one direction, caused by a dither drive 66 for inducing an oscillating motion about the dithered axis 30 or by an external motion of the vehicle frame, a change of capacitance is created between the plates 48 of proofmass 38 and the electrodes 52 and 54. This change is sensed by the rebalance electronics 64 which generate a feedback signal to return the proofmass 38 to its initial position.

These same signals from accelerometers $A_1$ and $B_1$ are then applied to the summing amplifier 60 and difference amplifier 62. The signal from amplifier 60 is filtered by a low pass filter 68 and applied to a quantizer 70 and then to a microprocessor and digital data bus 80 which transforms the analog acceleration data into digital pulses representing velocity increments $\Delta V$. The signals from difference amplifier 62 are synchronously demodulated by a signal from a demodulator 72 at the resonant drive frequency supplied by an oscillator 74 to the dithered drive 66 and the demodulator 72. The demodulated difference signal is applied to the quantizer 70 and the microprocessor and digital data bus 80 which transforms the analog angular velocity data into digital angular increments $\Delta \theta$.

The electronics contain, in addition to the signal processing, a precision reference voltage supply 76 and temperature sensors 78. The two channels of temperature data $T_1$ and $T_2$ are digitized by an A/D converter 83 and applied to the microprocessor 80 for adjustment of the data transmitted over the data bus line 82. The six accelerometers 26 are mounted in pairs with all output axes (OA) lying in a plane perpendicular to the angular rotation or dither axis 30. All pendulous axes (PA) are canted from this plane by $\beta$. This canting alternates up and down for each accelerometer around the rim of platform 12. The accelerometers which are paired are diametrically opposed to each other and have their input axes (IA) parallel to each other.

Figures 8, 9, 10:
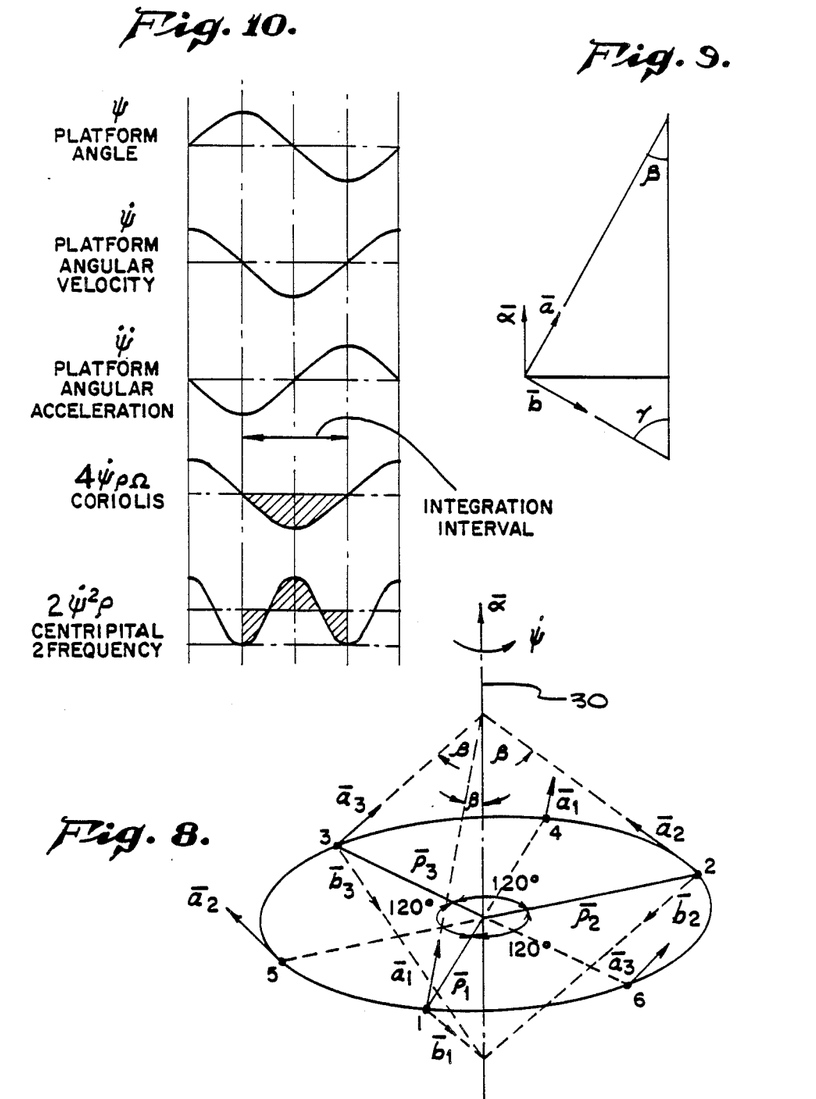
FIG. 8 is a vector diagram shown in perspective illustrating the input, output, and pendulous axes of three accelerometers.
FIG. 9 is one segment of the vector diagram shown in FIG. 8.
FIG. 10 is a set of curves illustrating the advantages of the circuitry shown in FIG. 7.

To demonstrate the relationship between the acceleration input axes (IA) and the angle velocity set of sensing axes or pendulous axes (PA) consider the configurations shown in FIGS. 8 and 9. Let the unit vector triad ($\bar{a}_1$, $\bar{a}_2$, $\bar{a}_3$) represent the acceleration input axes (IA) of 3 accelerometers (one from each paired set) and the unit vector triad ($\bar{b}_1$, $\bar{b}_2$, $\bar{b}_3$) represent the angle rate input axes or pendulous axes (PA). $\bar{a}$ is the unit vector about which dithering takes place and ($\bar{p}_1$, $\bar{p}_2$, $\bar{p}_3$) are the radius vectors of three equally spaced accelerometers:

$$|\rho_1| = |\rho_2| = |\rho_3| = \rho.$$

Since the body angle velocities are sensed here using the Coriolis acceleration components generated by the dithering relative motion with respect to the same body, it is beneficial to select the acceleration sensing axes to coincide with the three directions of the Coriolis accelerations. This relationship between the acceleration sensing axes (IA) and angle rate sensing axes (PA) is derived upon using the Coriolis acceleration component definition.

$$\bar{a} = 2\bar{\Omega} \times \bar{V} = 2\psi\bar{\Omega} \times (\bar{\alpha} \times \bar{\rho})$$

The general expression for acceleration $a_p$ measured at a point mass moving in a rotating system is (relative to inertial space)

$$\bar{a}_p = \bar{a}_o + \bar{\Omega} \times \bar{r} + 2\bar{\Omega} \times \frac{d\bar{r}}{dt} + \bar{\Omega} \times (\bar{\Omega} \times \bar{r}) + \frac{d^2\bar{r}}{dt^2} \quad (1.1)$$

where
$\bar{a}_o$=body reference point acceleration,
$\bar{\Omega}$=body angular velocity,
$\bar{r}$=body reference radius vector, and
d/dt=body relative time rate of change.

Let the dithering relative motion be represented by the velocity $$\bar{r} = \bar{\rho}\frac{dr}{dt} = \dot{\psi}\bar{\alpha} \times \bar{\rho} \quad (1.2)$$

The corresponding relative acceleration is $$\frac{d^2\bar{r}}{dt^2} = \ddot{\psi}\bar{\alpha} \times \rho + \dot{\psi}^2\bar{\alpha} \times (\bar{\alpha} \times \bar{\rho}) \quad (1.3)$$

Introducing (1.2) and (1.3) into (1.1) yields:

$$\bar{a}_p = \bar{a}_o + (\bar{\Omega} + \ddot{\psi}\bar{\alpha}) \times \bar{p} + 2\dot{\psi}\bar{\Omega} \times (\bar{\alpha} \times \bar{p}) + \bar{\Omega} \times (\bar{\Omega} \times \bar{p}) + \dot{\psi}^2\bar{\alpha} \times (\bar{\alpha} \times \bar{p})$$

Since for pairs of opposite sensors $$\rho_4 = -\rho_1$$
$$\rho_5 = -\rho_2$$
$$\rho_6 = -\rho_3$$

we obtain $$(a_{p1} + a_{p4}) \cdot a_1 = 2a_1$$
$$(a_{p2} + a_{p5}) \cdot a_2 = 2a_2$$
$$(a_{p3} + a_{p6}) \cdot a_3 = 2a_3$$

where $a_1$, $a_2$, $a_3$, are the projections of $\bar{a}_o$ on $\bar{a}_1$, $\bar{a}_2$ and $\bar{a}_3$ correspondingly.

Taking the differences $$\Delta a_{p1} = a_{p1} - a_{p4}$$
$$\Delta a_{p2} = a_{p2} - a_{p5}$$
$$\Delta a_{p3} = a_{p3} - a_{p6}$$

We obtain, $$\Delta a_{ci} = 2\{(\Omega + \ddot{\psi}\alpha) \times \rho_i + 2\psi\Omega \times (\alpha \times \rho_i) + \Omega \times (\Omega \times \rho_i) - \psi^2\rho_i\}$$

since $\bar{a} \times \bar{\rho}_i$ is perpendicular to $\bar{a}_i$ we can drop $\ddot{\Omega}\bar{\alpha}\times\bar{\rho}_i$, we thus have $$\Delta\bar{a}_{ci} = 2\{(\Omega \times \rho_i + 2\psi\Omega \times (\alpha \times \rho_i) + \Omega \times (\Omega \times \rho_i) - \psi^2\rho_i\}$$

This last relation, when resolved into the sensing directions axes $a_1$, $a_2$, $a_3$ can be reduced into the following scalar relations:

$$-\Delta a_{\rho 1} = 2\rho\left\{2\psi\Omega_1 + \frac{\sqrt{3}}{3}\left[\Omega_2 - \Omega_3 - \left(\Omega_1^2 + \frac{\Omega_2^2}{2} + \frac{\Omega_3^2}{2} + \Omega_1\Omega_2 - \Omega_2\Omega_3 + \Omega_1\Omega_3\right) - \psi^2\right]\right\}$$

$$-\Delta a_{\rho 2} = 2\rho\left\{2\psi\Omega_2 + \frac{\sqrt{3}}{3}\left[\Omega_3 - \Omega_1 - \left(\Omega_2^2 + \frac{\Omega_3^2}{2} + \frac{\Omega_1^2}{2} + \Omega_2\Omega_3 - \Omega_1\Omega_2 + \Omega_1\Omega_3\right) - \psi^2\right]\right\}$$

$$-\Delta a_{\rho 3} = 2\rho\left\{2\psi\Omega_3 + \frac{\sqrt{3}}{3}\left[\Omega_1 - \Omega_2 - \left(\Omega_3^2 + \frac{\Omega_1^2}{2} + \frac{\Omega_2^2}{2} + \Omega_3\Omega_1 - \Omega_3\Omega_2 + \Omega_1\Omega_2\right) - \psi^2\right]\right\}$$

These are the relations used to extract $\Omega_1$, $\Omega_2$, $\Omega_3$. Since the Coriolis terms $4\dot{\psi}\rho\Omega_1$, $4\dot{\psi}\rho\Omega_2$, $4\dot{\psi}\rho\Omega_3$ are the only amplitude modulated terms at the dither's frequency, it is rather straight forward to separate these terms.

Referring to FIG. 10, a set of curves is used to illustrate the relative ease of separating the terms. The first term $4\dot{\psi}\rho\Omega$ is the Coriolis term which is the desired term being sought within the circuitry of FIG. 7. The $2\dot{\Omega}^2\rho$ term is a term representing twice the frequency which is eliminated by integrating over a half cycle, as illustrated in FIG. 10. The remaining terms within the equation set forth above are DC terms which may be filtered by capacitants before the quantizer circuit 70.

While the foregoing invention has been described with three or six accelerometers 26 of the solid state silicon type mounted at an angle to the dithered axis 30, it will be understood that different numbers and types of accelerometers, different mounting angles, and different mounting configurations may be utilized within the teachings of the present invention. Further, addition of a receiver for global positioning signals from a global positioning satellite will convert the inertial measurement unit into a compact navigational unit having increased accuracy. Accordingly, the invention should be limited only by the accompanying claims.

I claim:

1. A three axis inertial measurement unit, comprising:
   a platform mounted for rotary motion about a single axis with respect to an object whose motion is being measured;
   a plurality of sensors mounted upon said platform, said sensors each having an input axis, an output axis, and a pendulous axis; and
   said sensors mounted upon said platform such that said input axis of each sensor is at a predetermined angle to said single axis and said platform.

2. An inertial measurement unit, as claimed in claim 1, wherein:
   said plurality of sensors are accelerometers.

3. An inertial measurement unit, as claimed in claim 2, wherein:
   said accelerometers are solid state devices.

4. An inertial measurement unit, as claimed in claim 3, wherein:
   said pendulous axes of said accelerometers are each arranged to lie within a plane which includes said single axis.

5. An inertial measurement unit, as claimed in claim 1, wherein:
   said plurality of sensors includes three accelerometers for providing an inertial measurement in a vibration free environment.

6. An inertial measurement unit, as claimed in claim 1, wherein:
   said plurality of sensors includes six accelerometers for providing an inertial measurement mounted upon said platform about said single axis; and
   pairs of six accelerometers are mounted opposite one another upon said platform to provide common mode rejection to reduce errors induced by vibration of said object whose motion is being measured.

7. An inertial measurement unit, as claimed in claim 6, wherein:
   said six accelerometers are mounted at an equal radius from said single axis and 60° apart upon said platform.

8. An inertial measurement unit, as claimed in claim 2, wherein:
   said rotary motion is an oscillating motion, and said single axis is a dither axis.

9. An inertial measurement unit as claimed in claim 2, wherein:
   said rotary motion is a spinning motion; and said single axis is a spin axis.

10. An inertial measurement unit, as claimed in claim 8, wherein:
    said platform is oscillated about said single dither axis by a sinusoidal velocity excitation.

11. An inertial measurement unit, as claimed in claim 6, additionally comprising:
    circuit means connected to said accelerometers to generate signals representing the linear acceleration and angular velocity thereof;
    summing circuit means for receiving said linear acceleration and angular velocity signals from said pairs of accelerometers arranged opposite one another for cancelling the angular velocity signals while retaining the linear acceleration signals; and
    differencing circuit means for receiving said linear acceleration and angular velocity signals from said two accelerometers arranged opposite one another for cancelling the linear acceleration signals while retaining the angular velocity signals.

12. An inertial measurement unit, as claimed in claim 1, wherein:
    said input axes of said plurality of sensors are each mounted at an angle to said platform to lie within a plane that includes said single axis.

13. A three axis inertial measurement unit, comprising:
    a platform mounted for rotary motion about a single axis;
    a plurality of accelerometers arranged in pairs mounted with respect to an object whose motion is being measured
    said accelerometers mounted upon said platform such that said input axis of each accelerometer is at an angle to said single axis and said platform; and
    said pairs of accelerometers are mounted opposite one another on said platform having said input, output and pendulous axes parallel to each other.

14. An inertial measurement unit, as claimed in claim 13, wherein:
    said output axes of said plurality of sensors are arranged in a common plane perpendicular to said single axis.

15. An inertial measurement unit, as claimed in claim 13, wherein:
    said pendulous axes of said plurality of sensors are each mounted at an angle to said platform to lie within a plane that includes said single axis.

16. An inertial measurement unit, as claimed in claim 15, wherein:
    said angle of said pendulous axes to said platform is an angle greater than 0° and less than 90°.

17. An inertial measurement unit, as claimed in claim 15, wherein:
    said angle of said pendulous axes to said platform is nominally 35.26°.

18. An inertial measurement unit, as claimed in claim 13, wherein:
    said input axes of said plurality of sensors are each mounted at an angle to said platform to lie within a plane that includes said single axis.

19. An inertial measurement unit, as claimed in claim 18, wherein:
    said angle of said input axes to said platform is an angle greater than 0° and less than 90°.

20. An inertial measurement unit, as claimed in claim 18, wherein:
    said angle of said input axes to said platform is nominally the complement of 35.26°.

21. A three axis inertial measurement unit, comprising:
    a platform mounted for an oscillating motion about a single dither axis;
    a plurality of accelerometers mounted upon said platform, said accelerometers each having an input axis, an output axis, and a pendulous axis;
    said accelerometers mounted upon said platform such that said input axis of each accelerometer is at an angle to said single dither axis and said platform; and
    said platform mounted about said dither axis by a plurality of vanes radiating from said dither axis toward said platform.

22. An inertial measurement unit, as claimed in claim 21, additionally comprising:
    a hub mounted about said dither axis;

said platform formed in the shape of a ring about said hub; and said vanes joining said hub and said platform along a plurality of radials from said dither axis.

23. An inertial measurement unit, as claimed in claim 16, additionally comprising:

piezoelectric driving means mounted upon said plurality of vanes to drive said platform into said oscillation about said dither axis.

* * * * *